United States Patent [19]
Thordarson

[11] 3,765,497
[45] Oct. 16, 1973

[54] HYDRAULIC COMPRESSION LOAD CELL
[76] Inventor: Petur Thordarson, 13700-42nd Pl. N.E., Seattle, Wash. 98125
[22] Filed: Sept. 5, 1972
[21] Appl. No.: 286,266

[52] U.S. Cl. ............... 177/208, 177/209, 73/141 A, 73/141 R
[51] Int. Cl. ........................... G01g 5/04, G01l 5/12
[58] Field of Search ................... 177/208, 209, 254, 177/256, 261, 263, 236; 73/141 A, 141 R

[56] References Cited
UNITED STATES PATENTS

| | | | |
|---|---|---|---|
| 2,662,539 | 12/1953 | Marrson | 177/208 |
| 2,667,184 | 1/1954 | Hailer et al. | 177/208 |
| 2,754,680 | 7/1956 | Koehler | 73/141 A |
| 2,927,458 | 3/1960 | Moon et al. | 73/141 A |
| 2,931,638 | 4/1960 | Weber | 177/209 |

Primary Examiner—Richard B. Wilkinson
Assistant Examiner—Vit Miska
Attorney—William B. Matthews

[57] ABSTRACT

A hydraulic compression load cell which includes interchangeable internal parts of different sizes to impart differing mechanical advantages adapting the cell to different load ranges, together with a mechanical amplifier which is adjustable to further expand and contract the load capacity of the cell.

3 Claims, 7 Drawing Figures

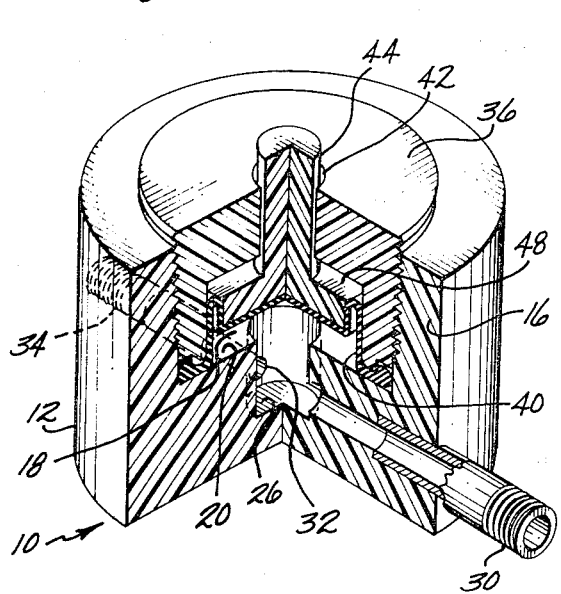
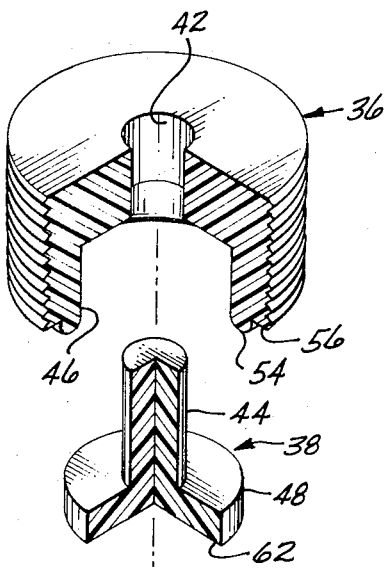
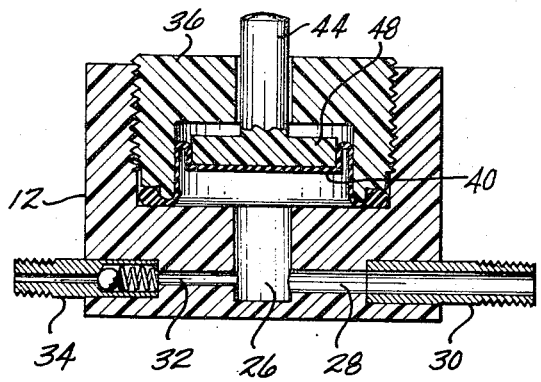
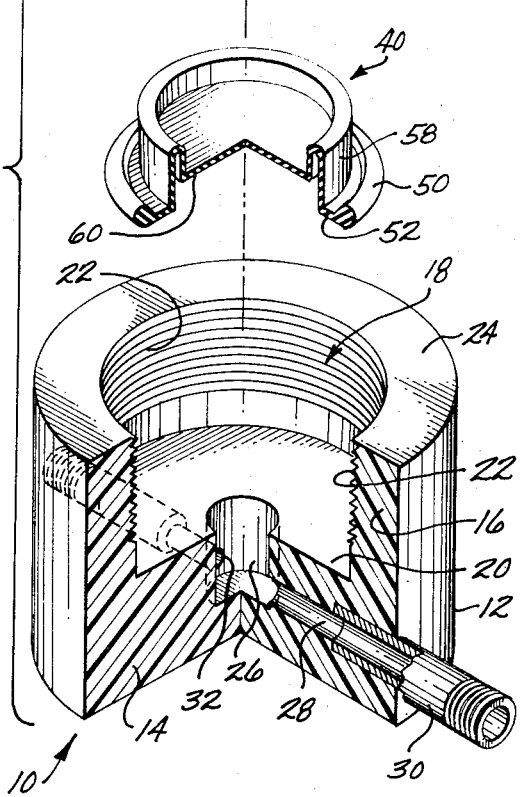

HYDRAULIC COMPRESSION LOAD CELL

BACKGROUND AND SUMMARY OF THE INVENTION

This invention relates to an improvement in load cells of the hydraulic compression type. Such devices are sometimes referred to as force or weight transmitting devices and serve as portions of load indicating instruments. Some are designed to accept very large loads and provide a relatively small fluid pressure output to operate a gauge or other indicator to measure the load applied.

Hydraulic compression load measuring devices in the past have been characterized by inability to handle applied loads over a sufficiently large range. Since each load cell is typically designed to accommodate only a relatively narrow range of loads, additional cost is incurred in purchasing load cells to accommodate loads in other ranges.

It is the primary object of this invention to provide a load cell having interchangeable internal parts to increase its load capacity range, together with an external adjustable mechanical amplifier to further extend (or reduce) the load range for selected internal parts.

An additional object is to provide a simple load cell which is easily and inexpensively manufactured and is characterized by durability and reliability and by repeatability of measurements.

A hydraulic load cell in accordance with the invention includes a housing having an internal cavity which is open at the top and has a fluid pressure outlet therein. A plurality of inserts are adapted externally to be threaded interchangeably into the housing cavity and each has a vertical central opening therein. The inserts have internal bottom-opening cavities of respectively different sizes corresponding to different load ranges. A plurality of piston elements corresponding respectively to the inserts have head portions of different sizes to be received in the bottom openings of respective inserts and each has a rod portion connected to the head portion to extend vertically through the central opening in the insert for engagement by an applied load. A plurality of diaphragms of different diameters are adapted interchangeably to be held in the housing cavity by respective inserts and engaged by head portions of corresponding piston members. Each diaphragm defines a fluid confining space within the housing cavity and communicating with the fluid pressure outlet. Hence the same external housing serves with interchangeable sets of internal parts to accommodate different ranges, avoiding necessity for obtaining entirely different units for such other loads. The load range can be altered without disconnecting the housing from the indicator coupled to the fluid pressure outlet.

The load cell is preferably combined with a mechanical amplifier consisting of a base portion on which the load cell is mounted and which includes an upright arm at one end. A load beam having one end pivotally mounted on the upright arm extends over the load cell to contact the rod portion of the piston member. The beam includes a load contact bracket mounted on its upper surface which is positionable along the beam to vary the proportion of the load transmitted to the load cell.

These and other features, objects and advantages of the invention will become more apparent from the following detailed description of the preferred embodiments, taken in conjunction with the accompanying drawings.

BRIEF DESCRIPTION OF THE DRAWINGS

FIG. 1 is an isometric, partially sectioned view of a load cell in accordance with the invention.

FIG. 2 is an isometric exploded view of the load cell of FIG. 1, with the separate parts partially sectioned to reveal structural details.

FIG. 3 is a sectioned side elevational view of the load cell of FIG. 1.

Figure 4:
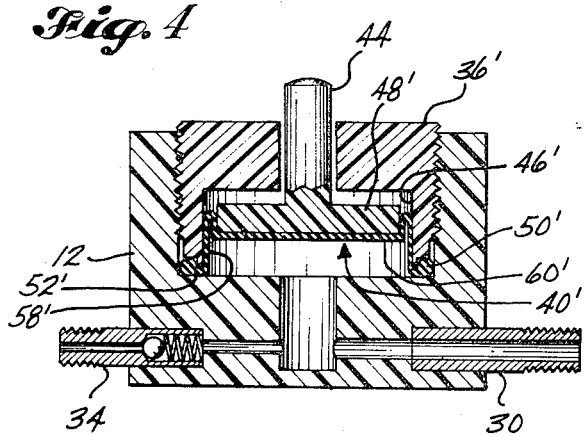
FIG. 4 is a sectioned side elevational view of the load cell of FIG. 1, with internal portions of a different size for measurement of smaller loads.

DETAILED DESCRIPTION OF PREFERRED EMBODIMENTS:

The load cell shown in FIGS. 1, 2 and 3 consists of a cylindrical housing 12 molded from a thermoplastic polyester material with fiberglass filler, or other suitable plastic material. The housing includes a base portion 14 and an upper portion 16 defining an internal cavity 18 having a flat bottom 20 and an internally threaded cylindrical wall 22 terminating at the top 24.

Communicating with the cavity 18 is a fluid pressure outlet consisting of a vertical opening 26 in the bottom of the cavity and a horizontal passageway 28 leading to a threaded metal coupling 30 mounted in the base portion 14 and axially aligned with the passageway 28. Also communicating with the opening 26 is a second passageway 32 leading to it from a check valve 34 utilized to fill the cell with an appropriate, relatively noncompressible fluid, such as transmission fluid or the like (not shown).

The basic housing 12 is the same for all of the illustrated embodiments of the invention. The internal parts which are interchangeable to obtain different mechanical advantages and therefore different load ranges include different sizes of inserts 36, piston members 38 and diaphragms 40. All inserts 36 are of the same size externally and are threaded to be received into the cavity 18, and include vertical central passageways 42 of the same size to receive rod portions 44 of corresponding piston members 38. However, the inserts have different sizes of bottom-opening cavities 46 which accommodate different sized head portions 48 of corresponding pistons and different sizes of diaphragms 40. The insert, piston and diaphragm set shown in FIGS. 1, 2 and 3 are representative of an intermediate size.

The diaphragm includes an annular O-ring portion 50 and flange portion 52 which rest on the bottom 20 of the cavity and are held therein by the rounded annular lip 54 of the insert 36, around the outside of which is a shoulder 56 forming a seat into which the O-ring portion 50 of the diaphragm is received. The vertical wall portion 58 of the diaphragm is received in the cavity or opening 46 of the insert, while its flat central portion 60 is engaged by the lower face 62 of the piston head portion 48. The wall portion 58 coupling the flat center portion 60 with the flange portion 52 flexes within the annular space around the periphery of the piston head and the walls of the insert cavity 46 in response to changes in applied load. Pressure applied to the diaphragm is transmitted by the captivated noncompressible fluid (not shown) through the outlet to a suitable gauge or other instrument (not shown) for indicating the load.

Figure 5:
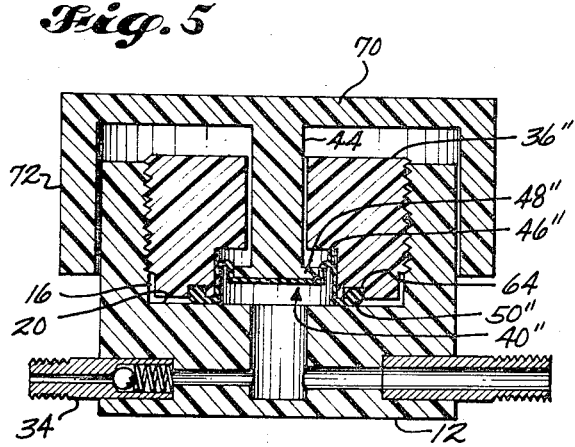
FIG. 5 is a sectioned side elevational view of the load cell of FIG. 1, again with internal parts of a different size inserted to obtain a different mechanical advantage, and also showing an alternative form of piston member.

The housing 12 of the load cells of FIGS. 4 and 5 are the same housing as that of FIGS. 1, 2 and 3, but new sets of internal parts have been substituted. The insert 36' in FIG. 4 has a larger bottom opening or internal cavity 46' and accommodates the larger piston head portion 48' and diaphragm 40'. The peripheral O-ring portion 50' of the diaphragm is essentially the same as before, whereas the flange portion 52' is narrower, the flat portion 60' is larger, and the annular wall portion 58' is of correspondingly greater diameter. The new combination of larger piston, diaphragm and insert within the same shell or housing 12 permit measurement of a much smaller load, with the same output instrument.

The same shell 12 in FIG. 5 holds a much smaller diaphragm 40'' and correspondingly smaller piston head portion 48'' within the smaller internal cavity 46'' of the insert 36''. In this case an annular grove 68 around the bottom of the insert receives the smaller O-ring portion 50'' of the diaphragm, which is less in diameter than the bottom 20 of the housing cavity 18.

In the same figure an alternative form of load contact member is shown namely the load table 70 coupled to the rod portion 44 of the piston. The annular wall 72 thereof connected to the flat top of the table overlaps and surrounds the upper portion of the load cell housing 12.

The load range of the cell is indicated by the following comparisons. A piston having a head portion which is 6 square inches in area will measure a one-ounce load with 1.3 psi output. In the same outer shell a piston having a head portion with cross sectional area of one-half of a square inch will measure a 1,000 pound load with 500 psi output. Hence the load range of the cell can be greatly expanded by a simple interchange of internal parts, with no change in the external arrangement or manner in which the load is applied.

Figure 7:
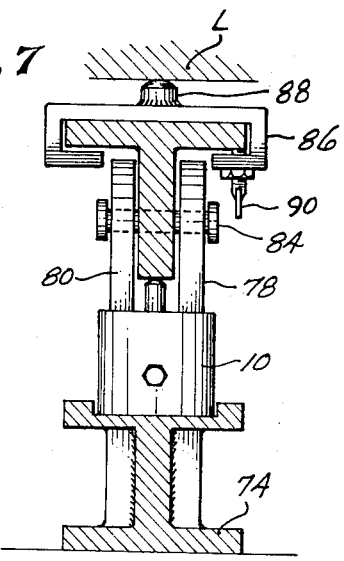
FIG. 7 is a partially sectioned view taken along line 7—7 of FIG. 6.
Figure 6:
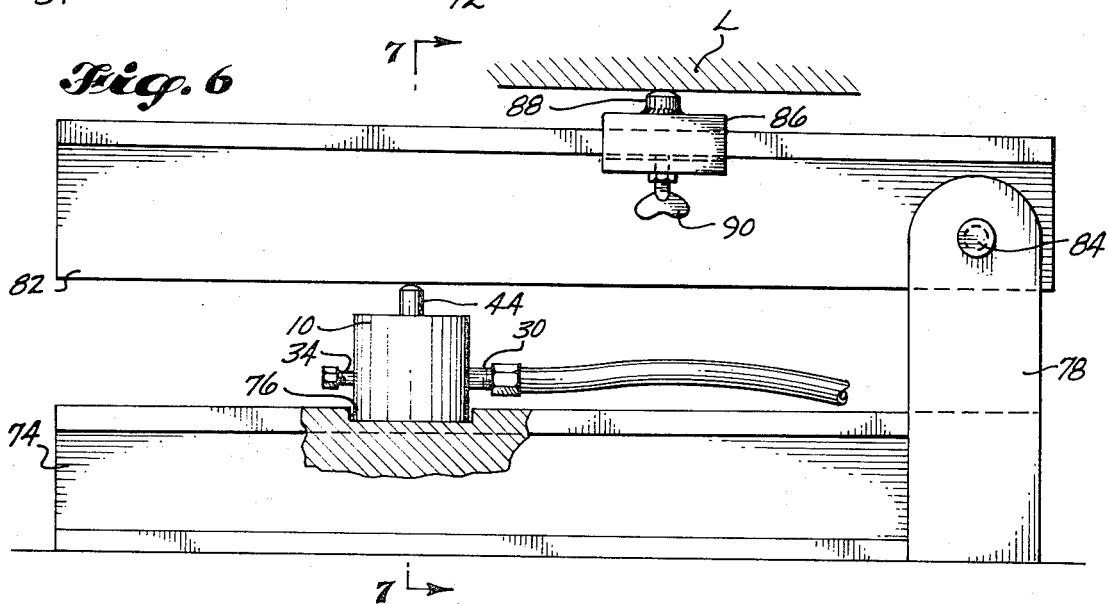
FIG. 6 is a partially sectioned side elevational view of a mechanical amplifier in combination with the load cell of FIG. 1.

The load range is further increased by utilizing the adjustable mechanical amplifier arrangement illustrated in FIGS. 6 and 7. The amplifier consists of a base I-beam 74 on which the cell 10 is mounted in a depression 76, upright members 78 and 80 secured to the base, a T-beam 82 pivotally coupled to the upright members by means of the pin 84, and a load contact bracket 86 having a knob 88 thereon to which a load L is applied. The bracket 86 is adjustable in position along the T-beam 82, secured by the wing nut 90.

By placing the load bracket 86 directly over the position of the piston rod portion 44, the effect of the mechanical amplifier can be eliminated. The load is amplified by placing the bracket to the left of the cell and deamplified by placing it to the right. The factor of amplification or deamplification is of course dependent upon the distance from the pivot point of pin 84 to the cell, as well as the length of the beam and the position of the bracket 86 thereon.

What is claimed is:

1. A hydraulic compression load cell comprising:
   a. a housing defining an internal cavity having a top opening and an outlet for transmitting fluid pressure;
   b. a plurality of inserts adapted externally to be threaded interchangeably into the housing cavity and each having a vertical central opening therein, said inserts having internal bottom-opening cavities of respectively different sizes corresponding to different load ranges;
   c. a plurality of piston elements corresponding to said inserts and having head portions of different sizes to be received in the cavities of the respective inserts, each having a rod portion connected to the head portion to extend vertically through the central opening in the insert for engagement by an applied load;
   d. a plurality of diaphragms of different sizes adapted interchangeably to be held in the housing cavity by respective inserts and engaged by the head portions of corresponding piston elements, each diaphragm defining a fluid confining space within the housing cavity communicating with the fluid pressure outlet.

2. The load cell of claim 1 wherein the piston element includes a load bearing table portion having an annular well extending downwardly overlapping the outside of said housing.

3. The load cell of claim 1 in combination with a mechanical amplifier comprising a base portion on which said housing is mounted and which includes an upwardly extending mounting arm, and a beam pivotally coupled to the mounting arm at one end and extending over the load cell to engage the piston element thereof, said beam including a load engaging element mounted on the top surface thereof and positionable along said beam at selected location.

* * * * *